United States Patent
Shamas et al.

(10) Patent No.: US 9,738,199 B2
(45) Date of Patent: Aug. 22, 2017

(54) BLOWOUT PREVENTER TRANSPORT CART

(71) Applicant: Nabors Drilling USA, Houston, TX (US)

(72) Inventors: Ralph Shamas, Houston, TX (US); Todd Fox, Houston, TX (US)

(73) Assignee: Nabors Drilling USA, LP, Houston, TX (US)

( * ) Notice: Subject to any disclaimer, the term of this patent is extended or adjusted under 35 U.S.C. 154(b) by 150 days.

(21) Appl. No.: 14/173,368

(22) Filed: Feb. 5, 2014

(65) Prior Publication Data

US 2015/0330556 A1 Nov. 19, 2015

Related U.S. Application Data

(60) Provisional application No. 61/763,194, filed on Feb. 11, 2013.

(51) Int. Cl.
| | |
|---|---|
| *B60P 1/00* | (2006.01) |
| *F16M 11/22* | (2006.01) |
| *B65G 67/04* | (2006.01) |
| *E21B 33/06* | (2006.01) |
| *F16M 11/04* | (2006.01) |
| *E21B 19/00* | (2006.01) |

(52) U.S. Cl.
CPC ................ *B60P 1/00* (2013.01); *B65G 67/04* (2013.01); *E21B 19/00* (2013.01); *E21B 33/06* (2013.01); *F16M 11/04* (2013.01); *F16M 11/22* (2013.01)

(58) Field of Classification Search
CPC ...... E21B 33/06; E21B 33/064; E21B 15/003; E21B 15/045; E21B 19/00; E21B 19/22; B60P 1/00; B65G 67/04; F16M 11/04; F16M 11/22
USPC ............. 166/379; 211/85.8; 269/289 R, 294; 280/838
See application file for complete search history.

(56) References Cited

U.S. PATENT DOCUMENTS

| | | | | |
|---|---|---|---|---|
| 3,739,853 | A * | 6/1973 | Wales | E21B 15/003 166/377 |
| 3,902,554 | A * | 9/1975 | Hooper | E21B 15/02 114/264 |
| 4,359,089 | A * | 11/1982 | Strate | E21B 33/06 166/383 |
| 5,195,361 | A * | 3/1993 | Wood | E21B 33/06 269/24 |
| 6,189,620 | B1 * | 2/2001 | McDowell | E21B 19/16 166/379 |
| 6,488,094 | B1 * | 12/2002 | McDowell | E21B 19/16 166/379 |
| 6,763,890 | B2 * | 7/2004 | Polsky | E21B 19/22 166/360 |
| 6,902,007 | B1 * | 6/2005 | Orr | E21B 33/06 166/379 |
| 6,955,223 | B2 * | 10/2005 | Orr | E21B 33/06 166/360 |
| 7,040,411 | B2 * | 5/2006 | Kainer | E21B 19/00 166/379 |

(Continued)

*Primary Examiner* — Patrick Hawn
(74) *Attorney, Agent, or Firm* — Adolph Locklar

(57) ABSTRACT

A BOP cart includes a platform including at least one mounting position adapted to receive the bottom of a BOP and a cart back extending generally perpendicular to the platform. The cart back includes at least one mounting feature positioned to secure the BOP to the BOP cart.

1 Claim, 2 Drawing Sheets

(56) References Cited

U.S. PATENT DOCUMENTS

| | | | | |
|---|---|---|---|---|
| 7,086,474 B1* | 8/2006 | Trevithick | ............... | E21B 33/06 |
| | | | | 166/379 |
| 7,341,109 B1* | 3/2008 | McDowell | ............... | E21B 19/16 |
| | | | | 166/379 |
| 7,389,820 B2* | 6/2008 | Day | ...................... | E21B 15/045 |
| | | | | 166/379 |
| 7,896,083 B2* | 3/2011 | Vickery | .................. | E21B 33/03 |
| | | | | 166/379 |
| 2003/0221822 A1* | 12/2003 | Polsky | .................... | E21B 19/22 |
| | | | | 166/85.4 |
| 2004/0231857 A1* | 11/2004 | Kainer | .................... | E21B 19/00 |
| | | | | 166/379 |
| 2006/0163415 A1* | 7/2006 | Geddes | .............. | B65H 75/4413 |
| | | | | 242/563 |
| 2007/0119596 A1* | 5/2007 | Day | ...................... | E21B 15/045 |
| | | | | 166/379 |
| 2009/0095465 A1* | 4/2009 | Vickery | .................. | E21B 33/03 |
| | | | | 166/79.1 |
| 2015/0226026 A1* | 8/2015 | Kent | ....................... | E21B 33/06 |
| | | | | 166/379 |
| 2015/0377409 A1* | 12/2015 | Vogt | ......................... | F16M 1/00 |
| | | | | 248/647 |

\* cited by examiner

BLOWOUT PREVENTER TRANSPORT CART

CROSS-REFERENCE TO RELATED APPLICATIONS

This application is a non-provisional application which claims priority from U.S. provisional application No. 61/763,194, filed Feb. 11, 2013.

FIELD OF THE DISCLOSURE

The present disclosure relates generally to equipment protection apparatuses, and specifically to protection and shipping of blowout preventers.

BACKGROUND OF THE DISCLOSURE

A blowout preventer, or "BOP," is a large, specialized valve or similar mechanical device used to seal, control and monitor oil and gas wells. Blowout preventers are critical to the safety of crew, rig, and environment, and to the monitoring and maintenance of well integrity; thus blowout preventers are intended to be fail-safe devices. An apparatus is used to transport this critical piece of equipment to and from the drilling site.

SUMMARY

The present disclosure provides for a BOP cart for transporting and storing a Blow Out Preventer (BOP). The BOP cart may include a platform, the platform including at least one mounting position adapted to receive the bottom of the BOP. The BOP cart may also include a cart back, the cart back extending generally perpendicular to the platform, the cart back including at least one mounting feature positioned to secure the BOP to the BOP cart.

The present disclosure also provides for a method of transporting a BOP. The method may include providing a BOP cart. The BOP cart may include a platform, the platform including at least one mounting position adapted to receive the bottom of the BOP. The BOP cart may also include a cart back, the cart back extending generally perpendicular to the platform, the cart back including at least one mounting feature positioned to secure the BOP to the BOP cart. The method may also include positioning the BOP cart in a vertical position such that the cart back is generally vertical and the platform is generally horizontal; positioning the BOP on the platform; securing the BOP to the at least one mounting feature; positioning the BOP cart in a horizontal position such that the cart back is generally horizontal and the platform is generally vertical; and transporting the BOP cart.

The present disclosure also provides for a BOP cart for transporting and storing a Blow Out Preventer (BOP). The BOP cart may include a platform. The platform may include at least one mounting position adapted to receive the bottom of the BOP, the mounting position forming a generally circular depression, the generally circular depression positioned to mate with the BOP; a plurality of holes, the plurality of holes positioned to receive one or more fasteners, the fasteners positioned to couple the BOP to the platform, the plurality of holes allowing the BOP to be mounted to the platform in more than one orientation; at least one platform leg, the platform leg positioned generally parallel to the platform, the at least one platform leg adapted to allow the BOP cart to rest on the platform leg when the BOP cart is in a vertical position. The BOP cart may also include a cart back. The cart back may extend generally perpendicular to the platform. The cart back may include two uprights, the two uprights joined by at least one brace; a hoist point, the hoist point adapted to permit the BOP cart to be hoisted; a retaining collar, the retaining collar positioned to be coupleable to the BOP to secure the BOP to the BOP cart; at least one auxiliary leg, the auxiliary leg extending from the cart back in a direction other than the direction of the platform, the auxiliary leg is pivotably coupled to the cart back, so that the auxiliary leg may be pivoted upright and retained to the cart back. The BOP cart may be dimensioned such that the width of the BOP cart is less than 8'6" and the height of the BOP cart is less than 9'6" when in the BOP cart is in a horizontal position.

BRIEF DESCRIPTION OF THE DRAWINGS

The present disclosure is best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION

Figure 1:
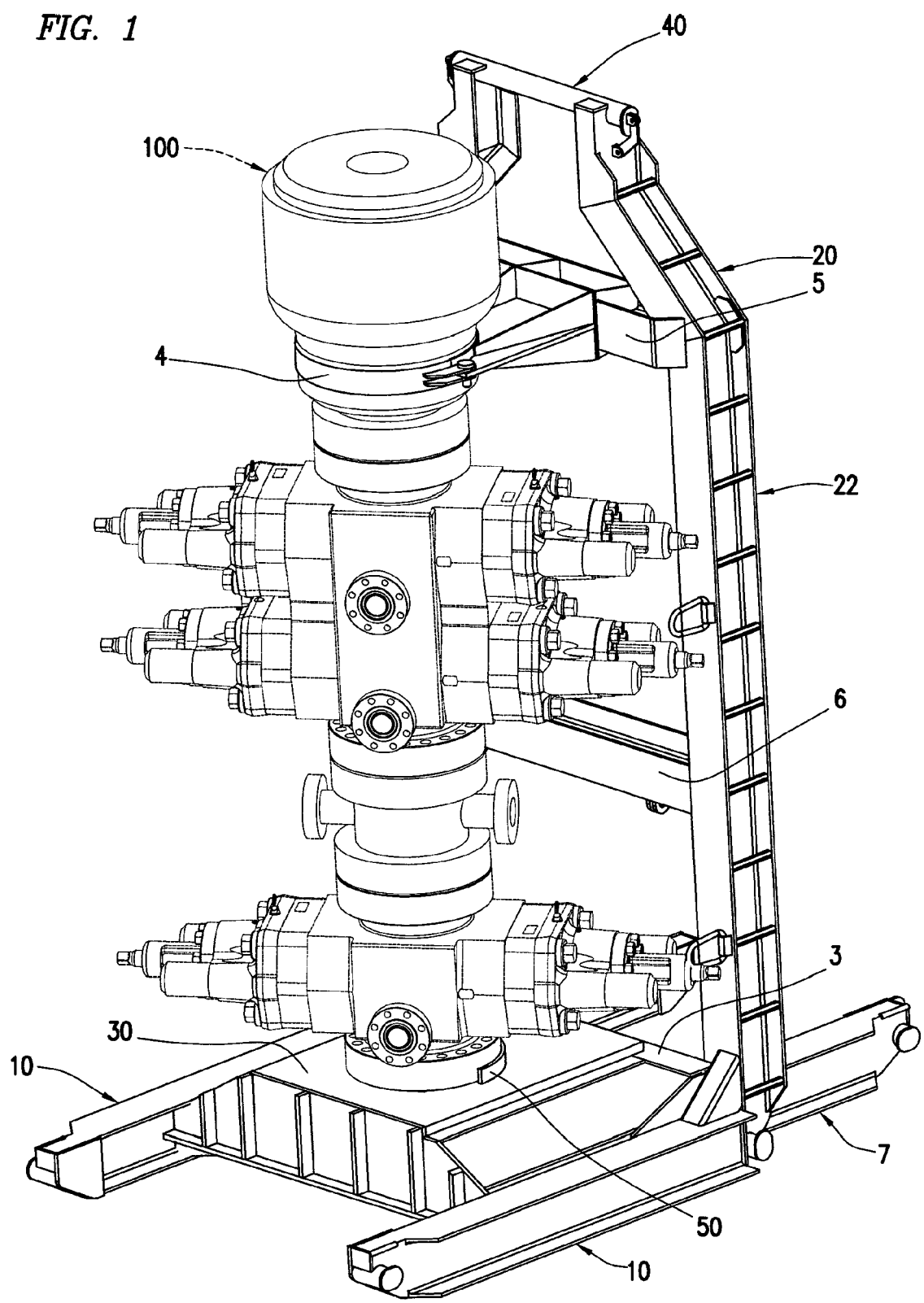
FIG. 1 is a depiction of an apparatus for transporting a BOP that is consistent with at least one embodiment of the present disclosure.

It is to be understood that the following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

FIG. 1 depicts BOP cart 1 consistent with at least one embodiment of the present disclosure. BOP cart 1 may include BOP cart back 20 and Platform 30. Platform 30 may extend generally perpendicularly from BOP cart back 20. FIG. 1 depicts BOP cart 1 in an upright position, with platform 30 horizontal and BOP cart back 20 in a vertical position. This position may be used, for instance, when mounting or storing BOP 100. Platform 30 may be positioned such that BOP 100 may be placed thereon.

Figure 2:
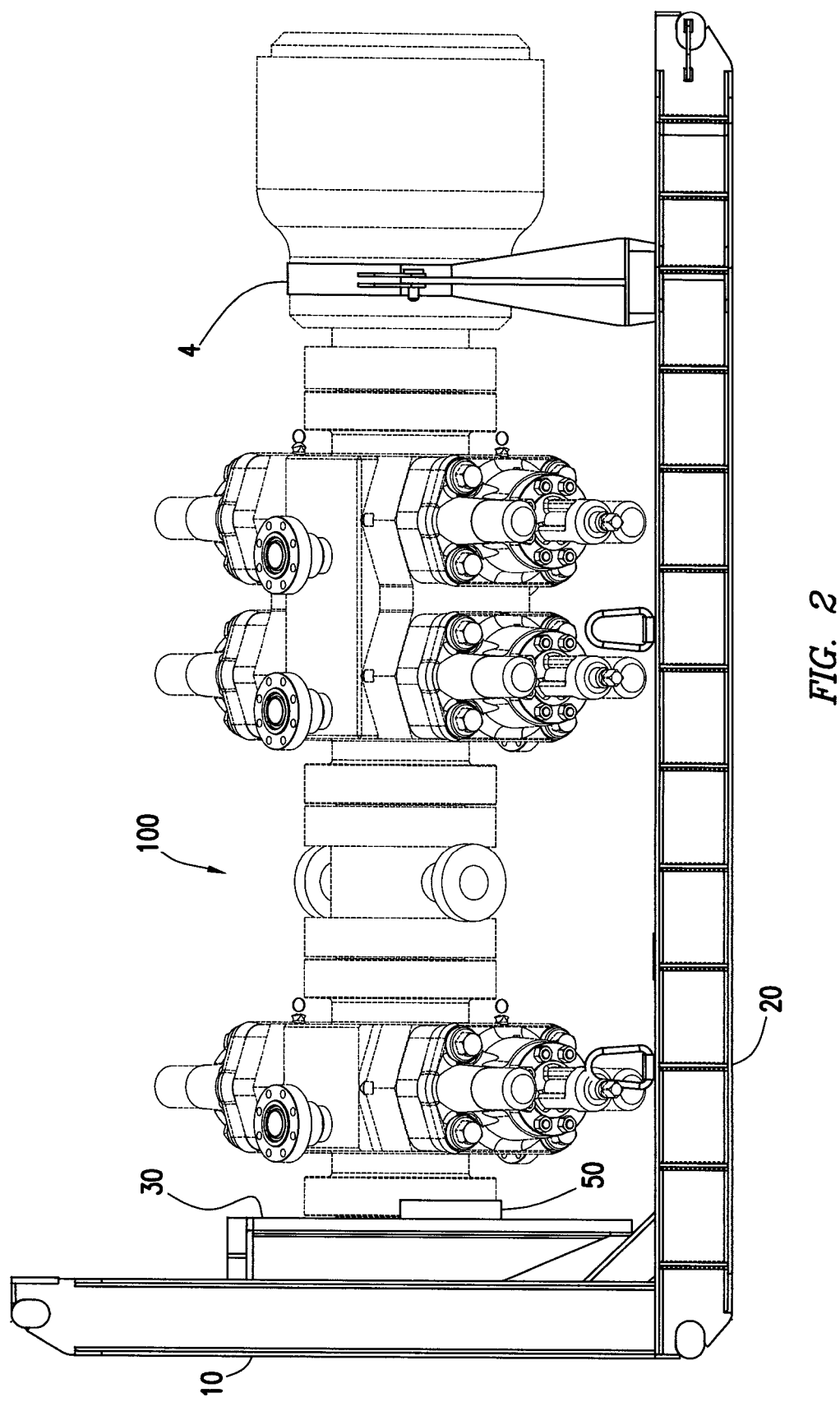
FIG. 2 is a depiction of the apparatus for transporting a BOP of FIG. 1 in the transport position.

When transporting BOP 100, on a truck, railcar or boat, BOP cart 1 may be positioned on its side, such that platform 30 may be generally vertical and BOP cart back 20 may be generally horizontal as depicted in FIG. 2. The process of transporting BOP 100 on BOP cart 1 may be termed "tail-boarding."

BOP cart back 20 may, as depicted in FIG. 1, include one or more uprights 22. Uprights 22 may be coupled to platform 30 by, for example and without limitation, bolting or welding. Uprights 22 may be coupled together at the end opposite platform 20 by hoist point 40. Hoist point 40 may be positioned to allow BOP cart 1 to be hoisted by, for example and without limitation, a winch or crane. In certain embodiments, BOP cart back 20 may include one or more braces. In the embodiment depicted in FIG. 1, BOP cart back 20 as depicted may include top brace 5, center brace 6, and bottom brace 3 which may extend between the uprights 22. Braces 5, 6, 3 may be coupled to uprights 22 by, for example, bolting or welding. Top brace 5, center brace 6, and bottom brace 3 may provide rigidity to BOP cart back 20.

In some embodiments, BOP cart 1 may include an assembly to secure BOP 100 to BOP cart 1. For example, as depicted in FIG. 1, retaining collar 4 may be coupled to BOP cart 1, and may be positioned to couple to BOP 100 placed on BOP cart 1. In some embodiments, retaining collar 4 may extend substantially perpendicularly to top brace 5. Retaining collar 4 may include a retaining ring positioned to encircle a portion of BOP 100 and serve to support and/or hold BOP 100 in place during transport or storage.

In some embodiments, BOP cart 1 may include one or more platform legs 10. Platform legs 10 may be coupled to platform 30, and may be positioned to permit BOP cart 1 to, for example, add stability when BOP cart 1 is in the vertical position. In some embodiments, one or more auxiliary legs 7 may be coupled to BOP cart 1. In some embodiments, auxiliary legs 7 may be coupled to BOP cart 1 and may extend in the direction opposite of platform 30. In some embodiments, one or more auxiliary legs 7 may be pivotably coupled to BOP cart 1, such that they may, for example, fold out of the way when BOP cart 1 is placed into the horizontal position. Likewise, when in the "flipped up" configuration, auxiliary legs 7 may be positioned to increase stability of BOP cart 1 when BOP cart 1 is in the horizontal position. In some embodiments, auxiliary legs 7 may include a retention feature to couple them in the "flipped up" configuration. In some embodiments, such as that depicted in FIG. 1, pins 6 may be used to do so.

In some embodiments of the present disclosure, platform 30 may include one or more holes 32 positioned to, for example, receive bolts, screws or other mechanisms designed to couple BOP 100 and platform and hold BOP 100 in place. Holes 32 may be positioned such that BOP 100 may be selectively disengaged from platform 9. In some embodiments, a plurality of holes 32 may be included, such that BOP 100 may be mounted to BOP cart 1 in more than one rotational orientation. In some embodiments, platform 30 may include recess 50, positioned to generally mate with the profile of BOP 100.

In some embodiments, BOP cart 1 may have dimensions that are within certain specifications. For example, US Department of Transportation and certain states have rules limiting the length, width, and height of a transported container. In certain of these jurisdictions, the maximum height of a non-permitted load is 13'6" and a width of not greater than 8'6". The typical height of most trailer transports is 4'. In certain embodiments of the present disclosure, BOP cart 1 is designed to transport BOP 100 and maintain BOP 100 and BOP cart 1 within these height and width limitations. In these embodiments, the edge to edge distance of distance 12 of platform legs 10 may be less than 8'6" and the BOP cart back outer edge to platform end edge distance 14 may be less than 9'6". Further, BOP 100 may be rotated and engaged in holes 32 to position BOP 100 in such a way that any extensions of BOP 100 do not extend further than either 13'6" high or 8'6" wide when in transport.

The foregoing outlines features of several embodiments so that a person of ordinary skill in the art may better understand the aspects of the present disclosure. Such features may be replaced by any one of numerous equivalent alternatives, only some of which are disclosed herein. One of ordinary skill in the art should appreciate that they may readily use the present disclosure as a basis for designing or modifying other processes and structures for carrying out the same purposes and/or achieving the same advantages of the embodiments introduced herein. One of ordinary skill in the art should also realize that such equivalent constructions do not depart from the spirit and scope of the present disclosure and that they may make various changes, substitutions, and alterations herein without departing from the spirit and scope of the present disclosure.

What is claimed is:

1. A BOP cart for transporting and storing a Blow Out Preventer (BOP), the BOP cart comprising:
    a platform, the platform including
        at least one mounting position adapted to receive the bottom of the BOP, the mounting position forming a generally circular depression, the generally circular depression positioned to mate with the BOP;
        a plurality of holes, the plurality of holes positioned to receive one or more fasteners, the fasteners positioned to couple the BOP to the platform, the plurality of holes allowing the BOP to be mounted to the platform in more than one orientation;
        at least one platform leg, the platform leg positioned generally parallel to the platform, the at least one platform leg adapted to allow the BOP cart to rest on the platform leg when the BOP cart is in a vertical position with the platform generally horizontal;
    a cart back, the cart back extending generally perpendicular to the platform, the cart back including:
        two uprights, the two uprights joined by at least one brace;
        a hoist point, the hoist point adapted to permit the BOP cart to be hoisted;
        a retaining collar, the retaining collar positioned to be coupleable to the BOP to secure the BOP to the BOP cart;
        at least one auxiliary leg, the auxiliary leg extending from the cart back in a direction other than the direction of the platform, the auxiliary leg is pivotably coupled to the cart back, so that the auxiliary leg may be pivoted upright and retained to the cart back;
    the width of the BOP cart being less than 8'6" and the height of the BOP cart being less than 9'6" when in the BOP cart is in a horizontal position with the cart back generally horizontal.

\* \* \* \* \*